(12) United States Patent
Lee et al.

(10) Patent No.: US 9,240,113 B2
(45) Date of Patent: Jan. 19, 2016

(54) LOW-POWER SECURITY AND INTRUSION MONITORING SYSTEM AND METHOD BASED ON VARIATION DETECTION OF SOUND TRANSFER CHARACTERISTIC

(75) Inventors: Sung Q Lee, Daejeon (KR); Kang-Ho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 582 days.

(21) Appl. No.: 13/270,444

(22) Filed: Oct. 11, 2011

(65) Prior Publication Data

US 2012/0087211 A1     Apr. 12, 2012

(30) Foreign Application Priority Data

Oct. 12, 2010   (KR) .................. 10-2010-0099331
Dec. 14, 2010   (KR) .................. 10-2010-0127920

(51) Int. Cl.
*G01S 15/00*   (2006.01)
*G08B 13/16*   (2006.01)
*G01S 15/04*   (2006.01)

(52) U.S. Cl.
CPC ............. *G08B 13/1609* (2013.01); *G01S 15/04* (2013.01)

(58) Field of Classification Search
USPC ......................................................... 367/93
See application file for complete search history.

(56) References Cited

U.S. PATENT DOCUMENTS

| | | | |
|---|---|---|---|
| 4,003,045 A | | 1/1977 | Stockdale |
| 4,719,604 A * | | 1/1988 | Naruse ............... G08B 13/1618 340/552 |
| 7,710,824 B1 * | | 5/2010 | Katzer .................... G01S 15/04 367/99 |
| 8,019,549 B2 * | | 9/2011 | Haque ..................... G01V 1/16 367/136 |
| 8,027,282 B2 * | | 9/2011 | Boehnke ............... G08C 17/02 340/10.3 |
| 2002/0052685 A1 * | | 5/2002 | Kamiya ................. G01C 21/36 701/408 |
| 2007/0223312 A1 * | | 9/2007 | Bartoli .................. G01F 23/284 367/98 |
| 2008/0224863 A1 * | | 9/2008 | Bachmann ......... G08B 13/1609 340/541 |
| 2009/0184830 A1 * | | 7/2009 | Watabe ................ G01N 29/024 340/628 |
| 2010/0202633 A1 * | | 8/2010 | Kim .......................... H04S 7/30 381/107 |
| 2010/0253241 A1 * | | 10/2010 | Van Endert ............ H03K 17/94 315/291 |

FOREIGN PATENT DOCUMENTS

| | | |
|---|---|---|
| JP | 08-077466 A | 3/1996 |
| JP | 10-283577 A | 10/1998 |
| KR | 1020040025148 A | 3/2004 |
| KR | 1020080055340 A | 6/2008 |
| KR | 1020090001750 A | 1/2009 |
| KR | 1020110067243 A | 6/2011 |

* cited by examiner

*Primary Examiner* — Naomi Small (57) ABSTRACT

Disclosed are a method for measuring a acoustic transfer function of a predetermined space to be secured or monitored through a correlation between sound signals acquired from a sound source generating device and a sound measuring device and a method and a system for judging whether there is an intrusion object by using a difference between an initially set acoustic transfer function information and varied acoustic transfer function information by using the method for measuring the transfer function. In the present disclosure, when an object moves or an intrusion object is generated in a predetermined space, intrusion or no intrusion is monitored by variation of the acoustic transfer function varied by the intrusion object even though there is no noise generated by the intrusion object.

8 Claims, 5 Drawing Sheets

LOW-POWER SECURITY AND INTRUSION MONITORING SYSTEM AND METHOD BASED ON VARIATION DETECTION OF SOUND TRANSFER CHARACTERISTIC

CROSS-REFERENCE TO RELATED APPLICATIONS

This application is based on and claims priority from Korean Patent Application Nos. 10-2010-0099331 filed on Oct. 12, 2010 and 10-2010-0127920 filed on Dec. 14, 2010, with the Korean Intellectual Property Office, the present disclosure of which is incorporated herein in its entirety by reference.

TECHNICAL FIELD

The present disclosure relates to a low power security and intrusion monitoring system and method based on variation measurement of a sound transfer characteristic that measure sound pressure of a predetermined space through a correlation between signals acquired from a sound source generating device and signals acquired from a sound measuring device and judge intrusion or no intrusion in a predetermined space by using a difference between a sound pressure distribution of the initially set and a sound pressure distribution varied by the intrusion.

BACKGROUND

A security/monitoring system is a field that has been researched for a long time and security and monitoring technologies in the related art include a security camera type, an IR type, an ultrasonic type, a sound measurement type, and the like.

U.S. Pat. No. 4,003,045 (Intrusion Detection Systems with Turbulence Discrimination, Stockdale, Roy Huntington NY US) discloses a method adopting the ultrasonic type. When there is no intrusion, upper and lower parts of an ultrasonic waveform are generated as the same amount and when intrusion occurs, turbulence of the waveform occurs. When the turbulent waveform is integrated through digital processing, it is possible to judge intrusion or no intrusion according to a degree of the turbulence waveform.

Since the method has a simple principle and transmits ultrasonic waves, and receives and processes the ultrasonic waves again by using an ultrasonic transducer, the method can be easily implemented. However, the method has a limit that no obstacle should be provided in the monitoring space. The reason is that when the ultrasonic waves start under a turbulent state by the existing object or condition, an abnormality in which an intrusion signal is generated occurs regardless of whether an intrusion or no intrusion occurs.

As another method, Korean Patent Application Laid-Open No. 2006-0128558 (Vehicle Ultrasonic Intrusion Detection Warning System and Method) is very similar to the above-mentioned first patent, but the application thereof is limited to the side of a vehicle. This method presents the vehicle ultrasonic intrusion detection warning system and method that can digitally modulate the ultrasonic waves, reduce misdetection by echoes or noise from the outside, and improve detection precision and further includes a technology that performs initialization setting through the amount of accumulated data in an initial setting step.

However, a disadvantage of the method is in that a dead zone is generated when the security space is extended to a wide space other than the vehicle because the ultrasonic waves are high in linearity. Further, this method has another disadvantage in that intrusion can be detected when omission of the ultrasonic waves are between an ultrasonic wave generator and an existing object is detected in the security space; however, intrusion at the back of the existing object cannot be detected. That is, security and monitoring in a space with an obstacle becomes difficult. Further, since a transfer function which is a unique characteristic of the monitoring space is not measured but variation to the initial setting is shown, it is difficult to overcome an influence by disturbance.

As yet another method, Korean Patent Application Laid-Open No. 2002-0056986 (Security device and method using environmental sound) discloses a method for monitoring whether an abnormality occurs in a monitoring place by using the environmental sound generated according to an environment of a predetermined place to be monitored. That is, a characteristic extracting unit extracts a predetermined characteristic from a sound signal by installing a microphone in the predetermined place to be monitored and an abnormality occurrence judging unit judges whether the abnormality occurs in the predetermined place by comparing the extracted characteristic with an environmental sound reference model stored in a memory, and a warning outputting unit generates a warning signal and warns a monitoring person when it is judged that the abnormality occurs.

A disadvantage of this method is that a maloperation possibility increases when the surrounding environment is quiet at the time of the initial setting, and since a sound state of a predetermined pattern is learned, it is very sensitive to surrounding noise after the initial setting through learning, such that a maloperation level is even larger when the surrounding noise is generated than in the intrusion state. Further, when an intruder or an intrusion object intrudes in state in which the surrounding environment is quiet, such that environmental sound does not vary, the method still maloperates even during intrusion.

As the last related art, Korean Patent Application Laid-Open No. 2009-0123752 (Low Power Security/Monitoring System Using Measurement of Sound Field Variation) discloses a method for judging intrusion or no intrusion in a predetermined space by using a difference between an initially set sound field and a sound field by the intrusion.

A disadvantage of the method is in that when intrusion is merely judged through the sound field difference, IF noise pollution is generated from the outside while measuring, and as a result, it is difficult to actually implement the method. In addition, when sound or noise is introduced from the outside, there is no method for solving an abnormality that occurs at the time of calculating the transfer function of the monitoring space.

SUMMARY

The present disclosure has been made in an effort to provide a low power security and monitoring system based on variation measurement of a sound transfer characteristic and a method thereof that can improve reliability while preventing an inoperation/maloperation of the security/monitoring system technology in the related art and can operate at low power while operating over 24 hours.

Further, the present disclosure has been made in an effort to provide a low power security and monitoring system based on variation measurement of a sound transfer characteristic and a method thereof that can overcome problems such as power consumption and the need for illumination at night occurred throughout a 24-hour operation in a security camera type which is the security/monitoring method of the related art, overcome a disadvantage that occurs due to the security/monitoring inoperation at the time of an intrusion through an IR cut-off suit or a cut-off device in an IR type, and overcome a power problem that occurs due to low efficiency of a sound wave to an air layer and a difficulty in applying a scan method by high linearity in the ultrasonic type.

In addition, the present disclosure has been made in an effort to provide a low power security and monitoring system based on variation measurement of a sound transfer characteristic and a method thereof that can have high reliability and reduce surrounding noise damage, which cannot be handled in the system for providing security/monitoring by recognizing sound field variation.

An exemplary embodiment of the present disclosure provides a low-power security and monitoring system based on variation measurement of a sound transfer characteristic, including: a sound source generating device outputting a sound wave of an audible frequency band having a predetermined frequency band within a predetermined monitoring space; and a sound measuring device calculating a acoustic transfer function which is a unique characteristic value of the monitoring space by receiving the sound wave outputted from the sound source generating device, and the sound measuring device judges intrusion or no intrusion by comparing a acoustic transfer function measured in a monitoring mode with a acoustic transfer function measured in an initial setting mode.

Another exemplary embodiment of the present disclosure provides a low power security and monitoring method based on variation detection of a sound transfer characteristic, including: outputting, by a sound source generating device, a sound wave of an audible frequency band having a predetermined frequency band within a predetermined monitoring space; receiving, by a sound measuring device, the sound wave outputted from the sound source generating device; calculating, by the sound source measuring device, a acoustic transfer function which is a unique characteristic value of the monitoring space from the received sound wave; and judging, by the sound source measuring device, intrusion or no intrusion by comparing a sound acoustic function measured in a monitoring mode with a acoustic transfer function measured in an initial setting mode.

According to the exemplary embodiments of the present disclosure, it is possible to increase an actual implementation possibility because a low-power operation is enabled in spite of being a 24-hour operation according to a measurement principle of a acoustic transfer function in a monitoring space while overcoming problems such as power consumption and the need for illumination at night that occurs throughout a 24-hour operation in a security camera type which is the existing security/monitoring method, overcoming a disadvantage that occurs due to the security/monitoring inoperation at the time of an intrusion through an IR cut-off suit or a cut-off device in an IR type, and overcoming a power problem that occurs due to low efficiency of a sound wave to an air layer and a difficulty in applying a scan method by high linearity in the ultrasonic type.

Further, according to the exemplary embodiments of the present disclosure, intrusion or no intrusion can be judged without an illumination and intrusion or no intrusion is monitored by variation in a spatial acoustic transfer function varied by an intrusion object even though there is no noise generated by the intrusion object, and as a result, monitoring reliability can be improved.

In addition, the present disclosure is implemented at the lowest level to detect variation by considering that noise pollution may be generated around a security space due to generation of sound in an audible frequency band from a sound source and pink noise or white noise, or a sine wave having a predetermined frequency band or a melody-type signal is used as a signal generated from a sound source generating device, thereby reducing surrounding noise pollution.

Moreover, the present disclosure can improve the monitoring reliability through a method for adjusting the magnitude in the sound source stepwise so that a noise to signal intensity against a situation of a maloperation occurred due to surrounding noise is large.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

The present disclosure presents a method capable of monitoring intrusion or no intrusion by variation in a sound field by an intrusion object even though there is no noise generated from the intrusion object when an object moves or the intrusion object is generated in a predetermined space.

The present disclosure presents an implementation method of intrusion detection depending on variation in the sound field by using sound pressure which is a representative physical value of the sound field in a method for judging the intrusion or no intrusion by the variation in the sound field and presents a method for judging the intrusion or no intrusion by acquiring a difference value in sound pressure before and after the intrusion based on a phenomenon depending on reinforcement/offset interference of the sound pressure and obtaining an absolute value of the difference value.

The present disclosure is implemented at the lowest level to detect variation with respect to a generated sound signal by considering that noise pollution may be generated around a security space due to generation of sound in an audible frequency band from a sound source and pink noise or white noise, or a sine wave having a predetermined frequency band is implemented or a melodious melody-type signal is used, as a signal generated from a sound source generating device, thereby reducing surrounding noise pollution.

In the present disclosure, an intrusion security system technology having high reliability is implemented through a method for adjusting the magnitude in the sound source stepwise so that a noise to signal intensity against a situation of a maloperation occurred due to surrounding noise is large.

Meanwhile, since as the sound source used in the present disclosure, a signal in a sound wave region of an audible frequency band (20 to 20,000 Hz) having high transfer efficiency in a general space is used and plural frequencies can be consecutively and simultaneously used, power consumption is minimized and reliability can be increased, such that utilization is high in a primary security and monitoring system.

When sound pressure generated from a sound source generating device in a predetermined space meets the object, the sound source is diffracted, reflected, and absorbed to have a complicated distribution in the space. The distribution in a frequency range will be described below. Consequently, the distribution corresponds to a transfer function for transferring the acoustic wave in the space and the transfer function is a unique characteristic of a monitoring space, such that the same value is maintained in a space with no variation. However, when certain object enters a predetermined space, a characteristic of the space varies, such that the sound pressure distribution varies, and as a result, the transfer function of the space varies. The present disclosure presents more effective detailed technologies for judging intrusion or no intrusion by using a difference in variation degree and implementing the judgment according to the exemplary embodiment of the present disclosure.

Meanwhile, an aspect in which the sound pressure distribution varies with respect to the intrusion object is shown by mutual interference of the sound pressure and the sound pressure may be smaller than a state before the intrusion by the mutual interference, but in some cases, two aspects in which the sound pressure may be further increased by reinforcement interference are both present. Therefore, a difference between sound pressures before and after the intrusion is acquired and thereafter, an absolute value of the difference value is obtained for judgment, such that accurate judgment can be made.

In an actual exemplary embodiment, since sound in an audible frequency band is generated from the sound source, the sound is preferably implemented at the lowest level to detect variation by considering that noise pollution may be generated around a security space. Further, as the signal generated from the sound source generating device, pink noise or white noise, or a sine wave having a predetermined frequency band is preferable, but as necessary, if a melodious melody type signal is used, noise damage to surrounding regions can be reduced.

However, as described above, when the sound operates at the lowest level, situations which may cause maloperations due to surrounding noise may be present. In this case, it is preferable to prevent the maloperations by adjusting the intensity in the sound source stepwise so that a noise to signal (S/N) intensity is high.

Hereinafter, an exemplary embodiment of the present disclosure will be described in detail with reference to the accompanying drawings. Prior to the detailed description of the present disclosure, like reference numerals refer to like elements as possible even though like elements are shown in different drawings and it is noted that a detailed description of the known configurations will be omitted when it is judged that the known configurations may obscure the spirit of the present disclosure.

Figure 1:
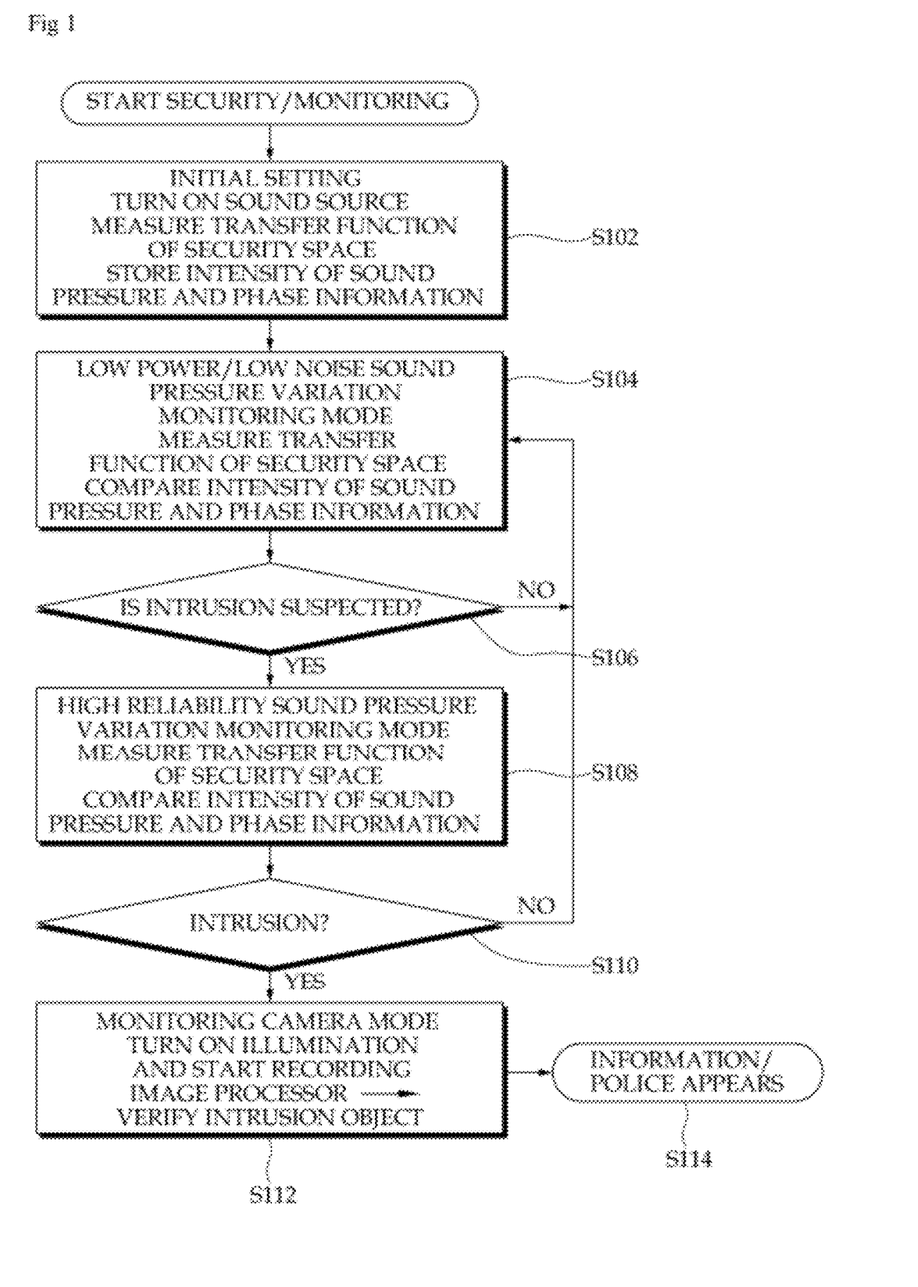
FIG. 1 is a configuration diagram of a security and monitoring system based on variation measurement of sound pressure according to an exemplary embodiment of the present disclosure.

FIG. 1 is a flowchart showing a security and monitoring procedure based on variation measurement of sound pressure according to an exemplary embodiment of the present disclosure. A security system is configured in an initial setting mode, a sound pressure variation monitoring mode, and link with a secondary security system and the sound pressure variation monitoring mode is constituted by a low power/low noise monitoring mode and a high reliability sound pressure variation monitoring mode.

When security monitoring starts, a transfer function of a space is first measured in a security/monitoring space to be stored as reference transfer function information in an initial stage (S102). When the setting of initial security mode is terminate, the monitoring mode starts and in the monitoring mode as the low power/low noise mode, the intensity of sound pressure generated from a sound source is set as the minimum intensity to detect intrusion (S106).

When the intrusion occurs or a situation in which the intrusion is suspected by noise from the outside arrives (S106), the low power/low noise mode is switched over to a high reliability mode to perform monitoring again (S108). In this case, the intensity of the sound pressure generated from the sound source is increased stepwise and can be measured up to a maximum sound pressure mode.

Meanwhile, according to a characteristic of the transfer function of the space, even though the intensity of the sound source increases, an input signal to output signal ratio is the same as long as the intrusion does not occur, and as a result, simple noise from the outside or certain intrusion can be determined through a comparison between the input signal to output signal ratio and an initially set value. When the intrusion is certain in the high reliability monitoring mode (S110), an alarm is immediately notified or the process is performed in link with a secondary security system such as a monitoring camera (S112 and S114). Connection with the secondary security system is installed as necessary and the primary security system can be independently used if it is sufficient as the variation detection of the sound pressure.

Figure 2:
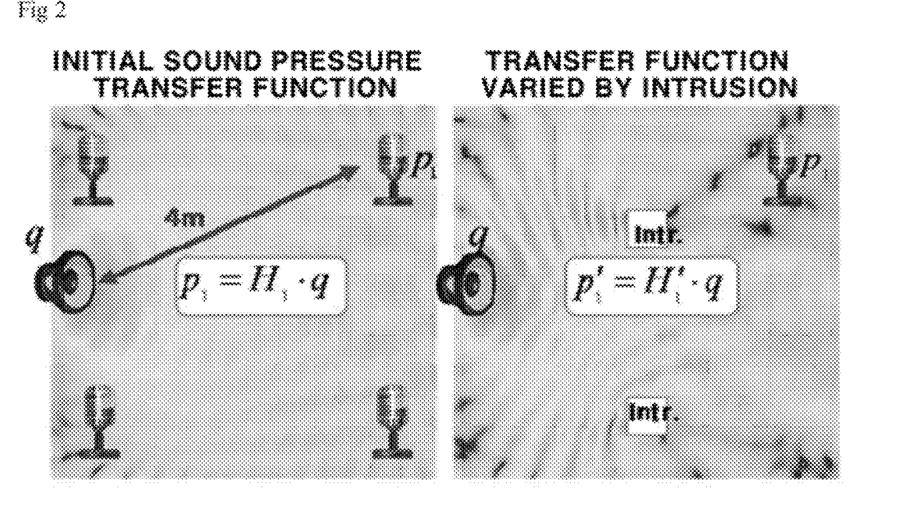
FIG. 2 is a diagram showing sound pressure distributions in a security space before and after intrusion and transfer functions thereof according to an exemplary embodiment of the present disclosure.

FIG. 2 shows a acoustic wave transfer function of a security space varied by intrusion with respect to a acoustic wave transfer function of an initial space. In the present disclosure, an equation for acquiring a general transfer function is followed in order to express transfer functions H(s) and H'(s). Amp=20 log(H(s)) and Ph=ang(H(s)) are acquired with respect to an initial acoustic wave transfer function and Amp'=20 log(H'(s)) and Ph'=ang(H'(s)) are acquired as a music transfer function for the varied space.

In the present disclosure, the intrusion is detected by measuring the transfer function unlike a method for simply acquiring a ratio or difference of the sound pressure in the related art. That is, in the related art, since only Abs(Amp−Amp')=20 log(Pout/P'out) is used, the intrusion was judged by only the input to output ratio rather than using a unique characteristic of the monitoring space. However, in the present disclosure, a difference varied by using abs(Amp−

Amp') which is an intensity ratio of the transfer function is evaluated. A more detailed calculation method will be described below.

$$\begin{aligned}\text{Abs}(Amp - Amp') &= 20\log(H) - 20\log(H') \\ &= 20\log(Pout/Vin) - 20\log(P'\text{out}/V'\text{in}) \\ &= 20\log(Pout/P'\text{out} \times V'\text{in}/Vin)\end{aligned}$$

In this case, P and V are root means square (RMS) values.

In the equation, since an output signal (generally, the sound pressure) is increased together in proportion to the intensity of an input signal (generally, a voltage), the transfer function is the same when no intrusion is present, but different when an intrusion is present.

The intensity ratio of the transfer function is mathematically a difference in log value, but meaningly a log value of a sound pressure ratio before and after the intrusion and the log value of the sound pressure for each frequency varies as +/−. When an absolute value for the variation value is acquired, the intrusion can be judged based on a variation rate of a predetermined intensity with respect to all cases in which the sound pressure increases or decreases by an intrusion object.

Figure 3A:
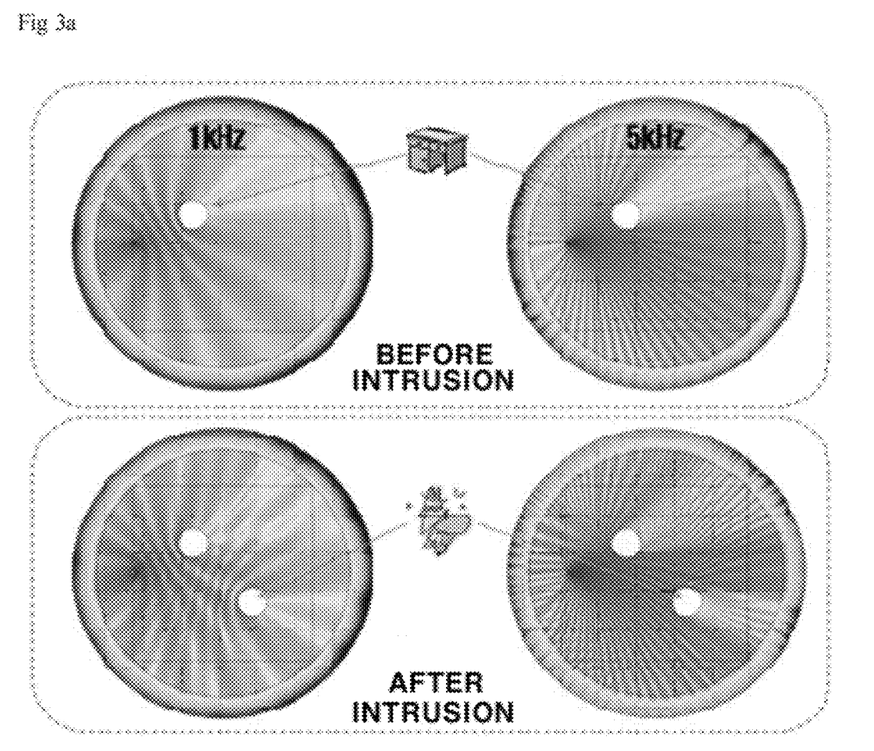
FIG. 3A is a diagram showing an analysis result of sound pressure distributions before and after intrusion according to an exemplary embodiment of the present disclosure.
Figure 3B:
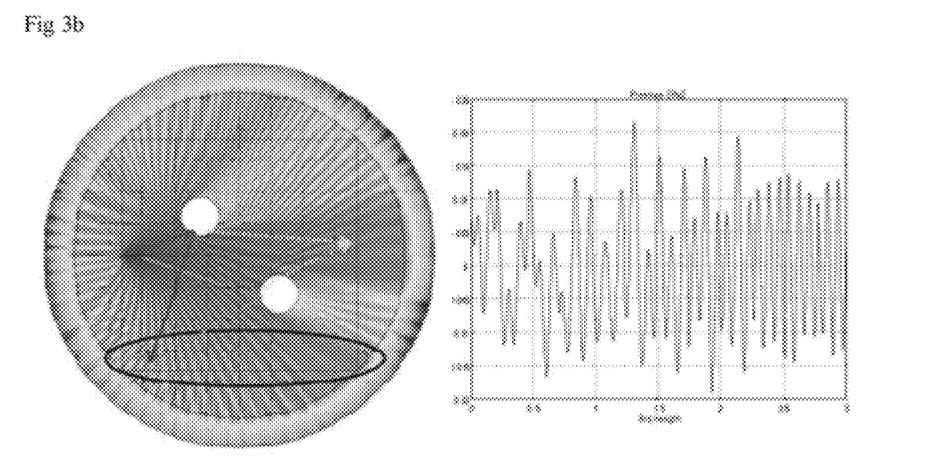
FIG. 3B is a diagram showing a swing result of sound pressure by offset/interference on a lower boundary after intrusion according to an exemplary embodiment of the present disclosure.

FIGS. 3A and 3B are diagrams showing an analysis result of numerical values for sound pressure distributions at 1 kHz and 5 kHz while there is an obstacle such as furniture before intrusion. After the intrusion on the lower side, the sound pressure distribution varies more complicatedly and an aspect thereof is shown as a phenomenon in which offset/reinforcement interference of the sound pressure distributed by the existing object occurs by the intrusion. A difference in the sound pressure by the reinforcement/offset interference is processed as the absolute value as described above to be compared.

Figure 4:
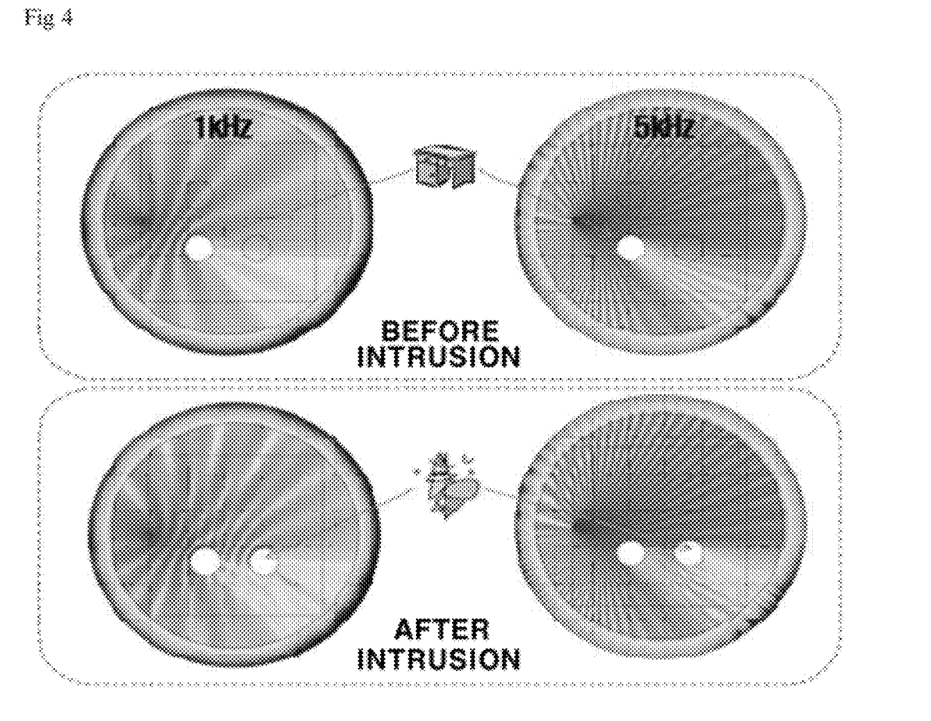
FIG. 4 is a diagram showing variation in a sound pressure distribution by an intrusion object at the back of a sound source reference obstacle according to an exemplary embodiment of the present disclosure.

FIG. 4 is a diagram showing a result acquired by numerically analyzing a phenomenon in which a difference in the sound pressure distribution occurs by the intrusion object even though there is an obstacle when the intrusion object is hidden at the rear surface by using the obstacle. In the present disclosure, the intrusion object can be detected by diffraction/reflection/absorption of a frequency even though there is the obstacle.

Figure 5:
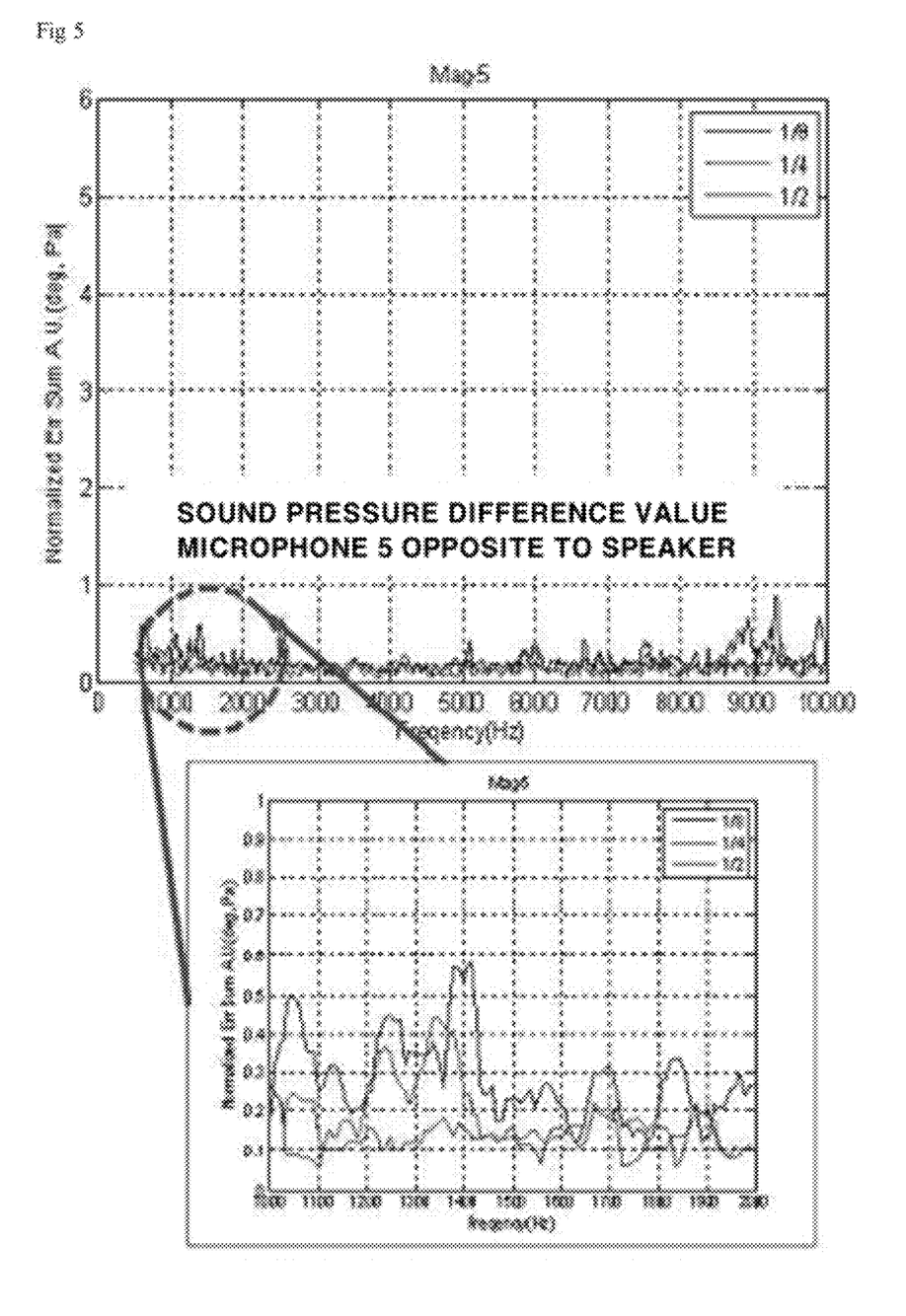
FIG. 5 is a diagram showing measurement of a noise level of a transfer function depending on an input intensity of a sound source according to an exemplary embodiment of the present disclosure.

FIG. 5 shows a graph experimentally acquiring a noise level of a transfer function in measurement depending on the intensity of sound pressure of a sound source. In the graph, it can be seen that when an input intensity is increased to 1/8, 1/4, and 1/2 with the maximum sound pressure intensity, V0, the noise level is gradually decreased. That is, when the intensity of the sound pressure of the sound source is increased, the S/N ratio increases, and as a result, the high reliability mode is enabled. However, in this case, the transfer function of the space defined as the input signal to output signal ratio is the same transfer function as long as the intrusion does not occur even though the intensity of the sound pressure of the sound source increases, and as a result, an abnormality in judging the intrusion or no intrusion through a comparison with the initial mode does not occur.

Figure 6A:
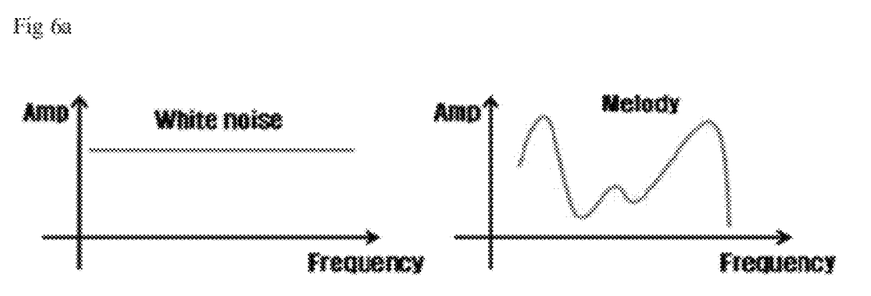
FIG. 6A is a diagram showing frequency components for white noise and a predetermined melody.
Figure 6B:
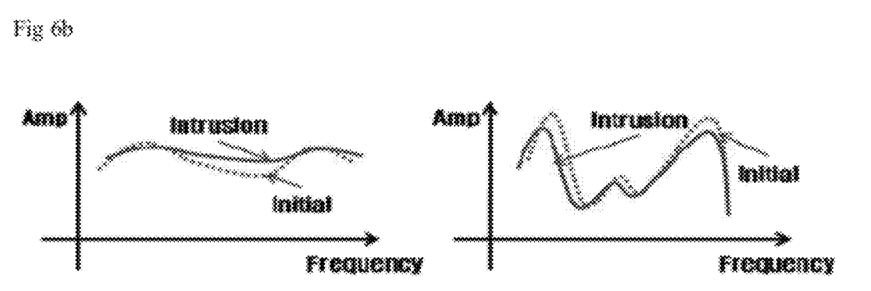
FIG. 6B is a diagram showing variation in a transfer function in an initial/intrusion state for each sound source according to an exemplary embodiment of the present disclosure.

FIGS. 6A and 6B are diagrams schematically showing variation of a transfer function with respect to various sound sources. As shown in FIG. 6A, pink noise, white noise, sinesweep, and the like may be used as the sound source, but a certain melody may be used for low noise or by considering a characteristic of the security space. In this case, the melody may be melodious music in terms of a temporal axis and the melody is constituted by several frequency components in terms of a frequency range. Therefore, in the case of using the melody in judging the intrusion, the security system can be applied through judgment with only several frequency components, not all frequencies.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A low-power security and monitoring system based on variation measurement of a sound transfer characteristic, the system comprising:
   a sound source generating device that outputs a sound wave of an audible frequency band having a predetermined frequency band within a predetermined monitoring space; and
   a sound measuring device that:
      calculates an acoustic wave transfer function, which is a unique characteristic value of the monitoring space and based on the sound wave outputted from the sound source generating device; and
      determines an intrusion into the monitoring space based on a comparison of an acoustic wave transfer function based on the sound wave and measured in a monitoring mode with an acoustic wave transfer function based on the sound wave and measured in an initial setting mode; and
   wherein, when the sound measuring device determines no intrusion into the monitoring space, the monitoring mode of the sound source generating device switches to a low power mode in which the sound source generating device outputs the sound wave having a lowest voltage level to be able to detect variation in the acoustic wave transfer function, and
   wherein, when the sound measuring device determines the intrusion into the monitoring space, the monitoring mode of the sound source generating device switches to a high reliability mode in which the sound source generating device outputs the sound wave by increasing a voltage level of the sound wave in a stepwise manner.

2. The system of claim 1, wherein the acoustic wave transfer function measured in the monitoring mode is a sound pressure transfer function that represents a unique sound transfer characteristic of the monitoring space.

3. The system of claim 1, wherein the sound source generating device outputs the sound wave as a music or melody type sound wave.

4. The system of claim 1, wherein the sound source generating device outputs the sound wave by combining a sound wave in a low-frequency range in which a diffraction phenomenon by an obstacle or an intrusion object is large in the monitoring space and a sound wave in a high-frequency range in which a reflection phenomenon is large.

5. A low power security and monitoring method based on variation detection of a sound transfer characteristic, the method comprising:
   outputting, by a sound source generating device, a sound wave of an audible frequency band having a predetermined frequency band within a predetermined monitoring space;
   receiving, by a sound measuring device, the sound wave outputted from the sound source generating device;

calculating, by the sound source measuring device, an acoustic wave transfer function, which is a unique characteristic value of the monitoring space, based on the received sound wave; and determining, by the sound source measuring device, an intrusion into the monitoring space by comparing a sound pressure transfer function measured in a monitoring mode with a sound pressure transfer function measured in an initial setting mode, wherein, when the sound measuring device determines no intrusion into the monitoring space, the monitoring mode of the sound source generating device switches to a low power mode in which the sound source generating device outputs the sound wave having a lowest voltage level to be able to detect variation in the acoustic wave transfer function, and wherein, when the sound measuring device determines the intrusion into the monitoring space, the monitoring mode of the sound source generating device switches to a high reliability mode in which the sound source generating device outputs the sound wave by increasing a voltage level of the sound wave in a stepwise manner for determining the intrusion.

6. The method of claim 5, further comprising:
acquiring the sound pressure transfer function by expressing an output sound pressure signal to an input voltage signal using a complex number or an intensity ratio and a phase difference.

7. The method of claim 5, wherein the outputting of the sound wave, the sound wave is outputted as a music or melody type sound wave.

8. The method of claim 5, wherein in the outputting of the sound wave, the sound wave is outputted by combining a sound wave in a low-frequency range in which a diffraction phenomenon by an obstacle or an intrusion object is large in the monitoring space and a sound wave in a high-frequency range in which a reflection phenomenon is large.

* * * * *